J. CLARK.
SPRAYER DEVICE.
APPLICATION FILED APR. 23, 1920.
1,387,352.
Patented Aug. 9, 1921.
2 SHEETS—SHEET 1.
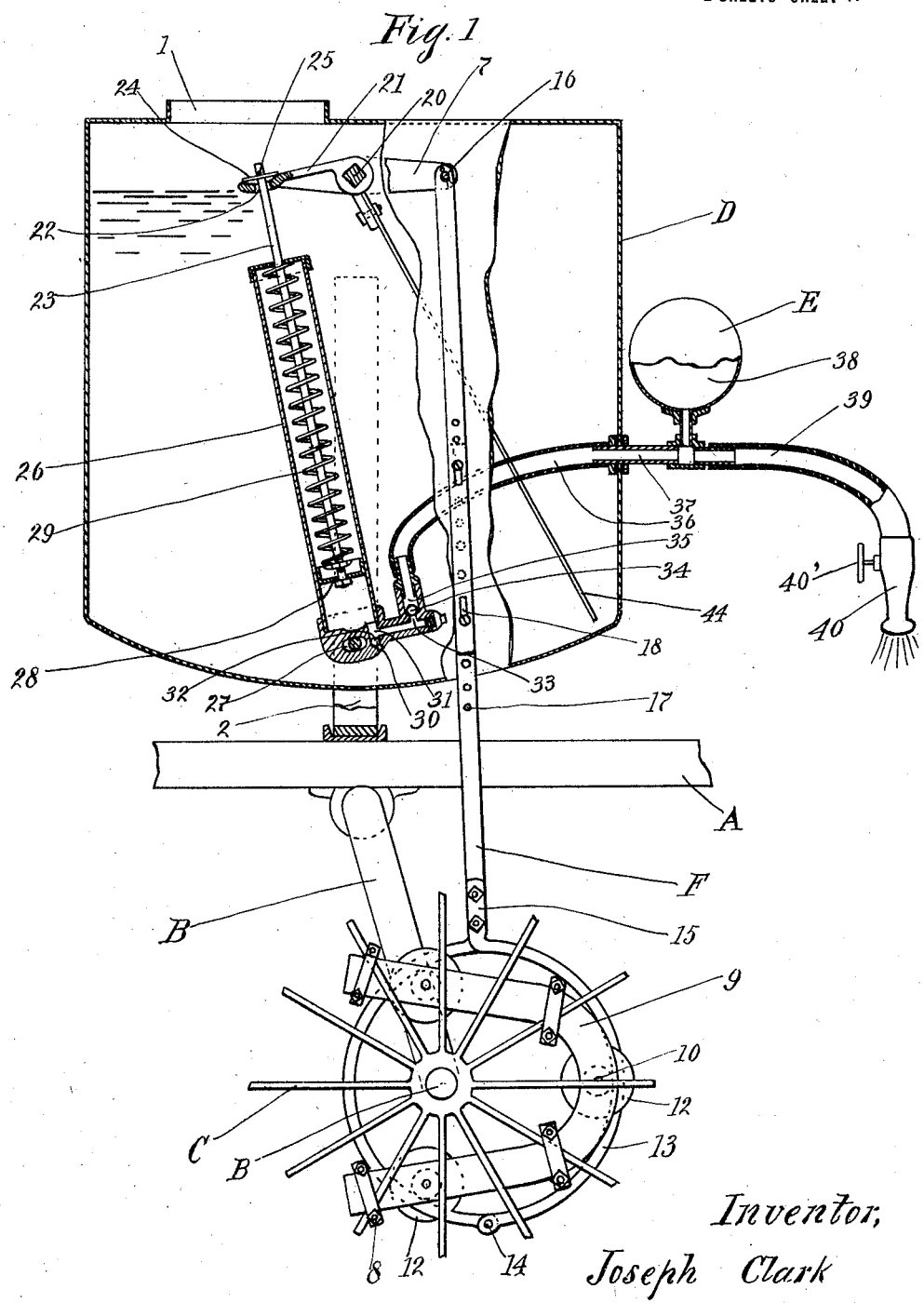
Inventor,
Joseph Clark
by [signature]
his Attorney.

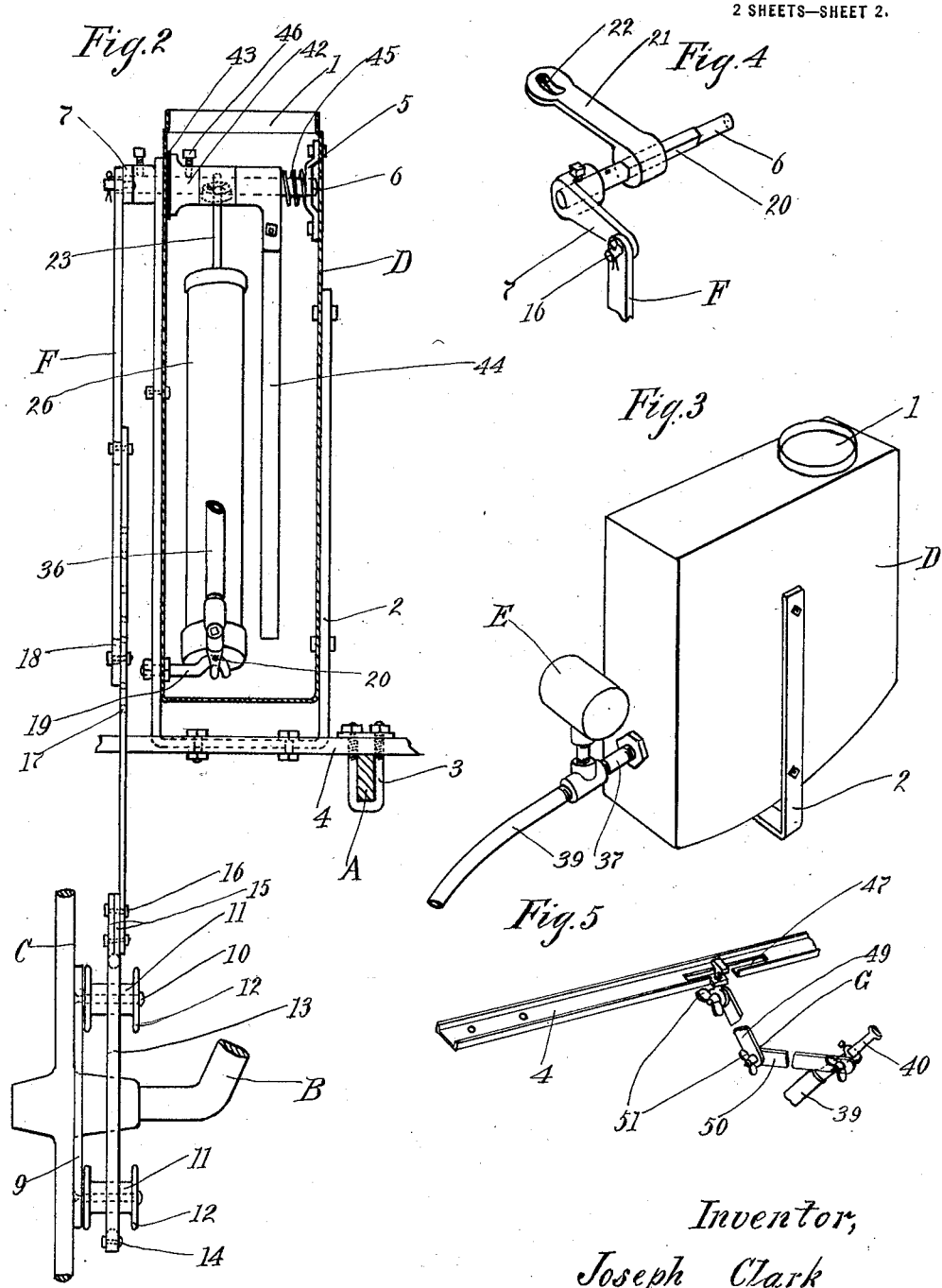

UNITED STATES PATENT OFFICE.

JOSEPH CLARK, OF DE GRAFF, MINNESOTA.

SPRAYER DEVICE.

1,387,352.

Specification of Letters Patent. Patented Aug. 9, 1921.

Application filed April 23, 1920. Serial No. 375,991.

*To all whom it may concern:*

Be it known that I, JOSEPH CLARK, a citizen of the United States, residing at De Graff, in the county of Swift and State of Minnesota, have invented certain new and useful Improvements in Sprayer Devices, of which the following is a specification.

This invention relates to improvements in spraying apparatus, its object being particularly to provide a spray attachment for cultivators actuated in a simple manner from the wheel, to maintain an air pressure for its spraying mechanism.

A further object of the invention is to provide a device of the class described, wherein the tank containing the spraying liquid may be open to the atmosphere, the air pressure commonly utilized for forcing the liquid through the spraying nozzle being generated in a separate comparatively small air chamber, the capacity thereof being sufficient only to maintain an uninterrupted spraying action during the return or suction stroke of the piston in the cylinder of the pump provided.

A further object of the invention, is to provide in a device of the class described certain improved features of construction whereby the manufacture thereof is greatly simplified and the device rendered neat and simple in appearance, much of the mechanism being concealed within the tank but being accessible through the open top thereof.

Another object of the invention is to provide an eccentric connection with the supporting wheels of the cultivator which may be subjected to a large range of side thrusts and racking without being rendered inoperative, said connection being applicable, due to its novel construction, to any cultivator, absolute vertical alinement of the eccentric with the pumping driving shaft not being necessary.

A further object of the invention is to provide, in a device of the class described a tank having but a single movable packed joint penetrating its walls for the purpose of operating the pumping mechanism, said joint being located adjacent to the top of said tank where the minimum internal water pressure exists.

To this end the invention consists of the features of construction, combination and arrangement of parts hereinafter particularly described and claimed. In the drawings:

Figure 1 is a vertical side view of the invention showing it mounted on the frame of a cultivator, the tank being shown partly in section.

Fig. 2 is an end view of the same, the tank being shown in section.

Fig. 3. is a perspective view of the tank alone.

Fig. 4 is a perspective view of the rock shaft for the pump, and

Fig. 5 is a perspective view of the supporting bar for the tank showing an adjustable hose support secured thereon.

A represents the frame of a cultivator, B the axle thereof and C one of the wheels supporting said frame. D designates a tank containing the spraying liquid, the level of the liquid being shown (Fig 1) near the top thereof, E the air container and F the eccentric rod.

The tank is comparatively high and narrow and has an opening 1 in the top thereof, a vertically disposed U bar extending upwardly over opposite sides thereof and being suitably bolted thereto. Suitably secured as by means of U bolts 3 on the frame A of the cultivator, is the supporting channel bar 4 transversely disposed on said frame, the upturned channel thereof receiving the lower portion of the U bar 2, the latter being suitably bolted thereto, so as to hold the tank in upright position flatwise longitudinally of the cultivator. The tank is positioned on the channel bar so as to be located adjacent to wheel C. Extending transversely of the tank, at the top thereof and journaled with one end in the bracket 5 secured to the side wall of the tank and intermediate its ends, in the opposite wall of the tank and one leg of said U bar, is the rock shaft 6, the latter extending beyond said U bar so as to rigidly support, in approximately horizontal position on the outer end thereof, the crank arm 7. Bolted on the wheel spokes by means of the U bolts 8 is the U shaped strap 9 having three inwardly extending headed bearing pins 10 rigidly secured thereon, each pin rotatably supporting a flanged roller or spool 11. The rollers are formed with comparatively wide faces so as to present a wide rolling surface. Adapted to roll on the rollers, is the hinged eccentric strap 13, the latter being formed of round bar steel of comparatively small diameter and comprised of two semi-circular sections having hinge connection 14, each section being formed opposite said hinge with a radially disposed lug 15, said lugs being in superposed relation and bolted together by means of the bolts 16. The eccentric rod F is bolted together with said lugs, and extends upwardly to the crank arm 7, and has pivotal connection 16 therewith, the rod being formed of two sections overlapping each other intermediate its ends, one of said sections having suitable bolt holes 17 alined with the slotted holes 18 in the other section, so that the two sections may be bolted together. Thus, the rod may be extended or shortened as desired. The rollers 11 are preferably uniformly spaced circumferentially with respect to the eccentric strap, so as to afford a three point rolling contact with the latter. By making the eccentric strap of round bar metal and positioning the rollers in the manner described, a large degree of inaccuracy is permissible in the manufacture thereof, as the round bar presents a rounded edge to roll on the rollers, as distinguished from a flat bar eccentric strap journaled on a solid eccentric. It has been found that the latter type of construction is impractical in that it binds at the slightest racking of the frame. As indicated in Fig. 2, the great amount of side play afforded by the rollers, will permit the eccentric rod to be considerably out of alinement with the crank arm 7 without in any way interfering with the operation of the pump. Piercing the side of the tank D, and the strap 2, and firmly bolted thereon so as to extend horizontally into the tank, is the hook bolt 19, the hook thereof opening downwardly.

Oppositely disposed to the crank arm 7 and removably fitting over the squared portion 20 of the shaft 6, is the lever arm 21, having a longitudinal disposed slot 22 cutting through its plate-like outer extremity. Extending from the hook 19 to said lever arm, with its piston rod 23 projected through said slot 22 and beyond the latter and being held loosely locked therein by means of the washer 24 and the pin 25, is the piston cylinder 26. The cylinder comprises a comparatively long tubular body having a cap closure at its top, through which the said piston rod loosely extends, said body being formed at its lower extremity with an oblong eye 27 adapted to removably receive the hook bolt 19 so as to pivot thereon. Secured to the piston rod is the piston 28, the latter being forced downwardly in the cylinder by the coil spring 29 surrounding said rod, and abutting at opposite ends against said cap and piston, the washer and pin 24 and 25 forming a stop whereby the stress of the spring is transferred to the rock shaft. Thus, when the cultivator is moved, the eccentric rod reciprocates the rock shaft, the lever arm 21 on its downward stroke permitting the spring to advance the piston. The piston is forced downwardly solely by the stress of the spring 29, the lever arm 21 functioning only to move the piston through its upward stroke. Below the piston the cylinder is formed with an intake opening 30 communicating with the chamber 31, the latter being in open communication with the interior of the cylinder, said intake opening being closed interiorly by the ball valve 32. Communicating with the chamber 31 is the outlet opening 33, the latter being closable by the ball valve 34 (constituting a check valve) in the chamber 35, said chamber being in open communication with the flexible hose member 36, the latter being connected with the nipple 37 extending through the wall of the tank. Outside of the tank, and supported on said nipple and in open communication with the interior thereof, is the air chamber 38, the interior of said nipple communicating also with the hose 39 having a suitable closable spray nozzle 40 at the end thereof, the spray being controlled by the hand wheel 40'. The flexible hose member 36 permits the pump cylinder to bodily oscillate, the use of a hose obviating the use of gasket packed elbow joints which latter would be necessary if iron pipes were used.

Rigidly but removably mounted on the rock shaft, is the roller 42, a gasket 43 between the latter and the wall of the container surrounding said shaft. Also slidable laterally on the squared portion of the rock shaft, is the agitator arm 44, the latter extending downwardly to a point adjacent to the bottom of the tank and reciprocating with the rock shaft so as to constantly agitate the spraying liquid during the operation of the pump. Surrounding the shaft between the bracket 5 and the agitator arm, is the coil spring 45, the latter being positioned under stress so as to press the collar 42 against the gasket 43 to effect a water tight joint around the rock shaft. By constructing the rock shaft with a square section the lever arm 21 and the agitator arm may be easily removed endwise, the shaft being insertible from the outside through the walls of the tank and into the bracket 5. A set screw 46 firmly holds the collar positioned on the shaft and is conveniently accessible through the opening 1 for the purpose of disassembling the pumping mechanism. In the supporting bar 4, and located as to be approximately central with the cultivator is the slot 47 adapted to receive the T-bolt 48 whereon is supported the jointed hose support G, the latter consisting of bars 49 and 50 pivotally connected with the bolt 48 so as to be held in extended position by means of the thumb nuts 5, suitable hose gripping means at the free end of the bar 50 being provided.

In operation, the rock shaft is reciprocated as hereinbefore described, the piston sucking a quantity of spraying liquid through the inlet 30 into the cylinder, and the spring forcing said liquid at each stroke through the ball valve 34 and the continuous conduit formed by the hose members 36 and 39, together with the nipple connection, to the sprayer nozzle and out through the latter. As the area of the perforation in the spray nozzle is comparatively small a back pressure is set up in the interior of said conduit, whereby the air in the chamber 38 is compressed, so that during each suction stroke of the piston the pressure confined in the conduit by the ball valve 34 will maintain an uninterrupted spraying stream until the next succeeding stroke of the piston, when the operation will be repeated. Thus, the air in the chamber 38 is compressed with each forward stroke of the piston, the compressed air being sufficient only for maintaining a continuous spray during the return stroke of the piston. This obviates the necessity of having the main liquid containing tank constructed so as to be air tight, as is the case in many of the spraying devices, it being difficult to keep a large vessel air tight, and it requiring considerable preliminary pumping in preparing the device for service. Further, where a high air pressure must be maintained in the liquid container any packed joints pertaining to the pumping mechanism, extending through the walls thereof, becomes a constant care because of continuous leakage. In applicant's device but a single packing joint high up near the water level is utilized, the pressure at that point being very low and practically negligible. When the pressure in the chamber 38 overbalances the tension of the spring 29 the lever arm 21 will run freely back and forth over the piston rod.

The cylinder oscillates on the hook bolt 19 and when detached from the rock shaft may be easily unhooked from above and bodily withdrawn through the opening 1. Thus the device may be shipped in knock-down form and easily assembled by an unskilled person

I claim:

1. In combination with the frame and a supporting wheel, an adjacently supported liquid container, a rock shaft within the container projecting through the side at the top thereof, mechanism operatively connecting the wheel with said rock shaft to actuate the latter when the wheel is moved, a water pump having an intake and a discharge opening within the container operatively connected with said rock shaft to be operated thereby and extending downwardly and having pivotal support adjacent to the bottom of said container to be oscillated thereon, a discharge pipe rigid in the side of said container and projecting therethrough, and a flexible connection within the container between the said discharge pipe and discharge opening.

2. In combination with the frame and a supporting wheel, an adjacently supported open top liquid container, a rotatably mounted rock shaft within the container near said open top, said rock shaft extending between opposite walls of the container and through an opening in one of said walls, packing means around said rock shaft adjacent said opening, mechanism operatively connecting the wheel with said rock shaft to actuate the latter when the wheel is moved, a discharge conduit extending through the wall of said container, pumping mechanism within the container operatively connected with said rock shaft and said discharge conduit, and a spring for holding said rock shaft under stress against said packing means.

3. In combination with a frame and a supporting wheel, an adjacently supported open top liquid container, reciprocatory mechanism rotatably supported within the container adjacent the top thereof, said mechanism constructed so as to be readily removable from said open top, means operatively connecting said wheel with said reciprocatory mechanism to reciprocate the latter when the wheel is moved, pumping mechanism including a piston rod, extending downwardly beneath the level of the liquid to the bottom of said container, said piston rod having operative readily detachable connection with said reciprocatory mechanism to be reciprocated thereby, a readily detachable discharge conduit forming part of said pumping mechanism leading to and through the wall of said container, and a hook at the bottom of the container forming a readily detachable connection between said pumping mechanism and the container, whereby the pumping mechanism may be readily detached from the container from a position at said open top and bodily withdrawn therethrough.

4. In a sprayer attachment of the class described the combination with the frame and a supporting wheel, an adjacently supported liquid container, pumping mechanism within the container, a reciprocatory part thereof extending through the wall of the latter, a discharge conduit for said pumping mechanism leading through the wall of the container, and actuating mechanism operatively connecting said extended reciprocatory part and said wheel to reciprocate said part when the wheel is moved, said actuating mechanism comprising three equidistantly spaced comparatively wide faced flanged rollers arranged in a circle and supported on the wheel so as to be eccentric with the center thereof, an eccentric strap formed of bar iron of comparatively small sectional area encircling said three rollers so as to roll on the wide faces thereof, and a longitudinally adjustable eccentric rod rigidly connected with said eccentric and pivotally connected with said reciprocatory part.

5. The combination with a frame and a supporting wheel, a liquid container supported on the frame, a reciprocatory shaft including a crank arm, said shaft rotatably mounted at the top of the container, a connection between said wheel and said shaft for reciprocating the latter when said wheel is rotated, pumping mechanism having a discharge conduit leading to the outside of the container said pumping mechanism having operative connection with said crank arm and extending from the latter into the liquid to a position adjacent the bottom of the container, a pivotal support at the bottom of the container for the pumping mechanism to enable the latter to move to agitate the liquid when said crank arm is actuated, and additional liquid agitating means extending downwardly from said reciprocatory shaft.

In testimony whereof I affix my signature.

JOSEPH CLARK.